Figure 1:
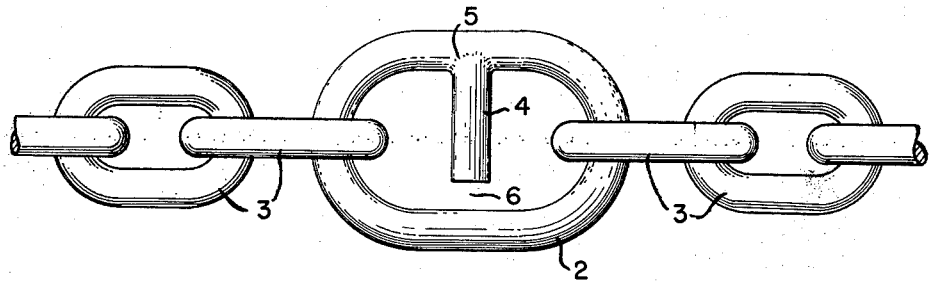

Feb. 12, 1963 R. S. GORDON 3,077,178
DEVICE FOR SUSTAINING LOADS HAVING A DEFORMABLE
INDICATING ELEMENT
Filed Feb. 27, 1961

INVENTOR
Ralph S. Gordon

United States Patent Office 3,077,178
Patented Feb. 12, 1963

3,077,178
DEVICE FOR SUSTAINING LOADS HAVING A DEFORMABLE INDICATING ELEMENT
Ralph S. Gordon, York Township, York County, Pa., assignor to The McKay Company, Pittsburgh, Pa., a corporation of Pennsylvania
Filed Feb. 27, 1961, Ser. No. 91,893
4 Claims. (Cl. 116—114)

This invention relates to a device for sustaining loads having a deformable indicating element and particularly an element for visually indicating when the device, such as a sling or the like, has been overloaded.

For safety reasons it is desirable to avoid imposing upon a sling or the like a load substantially exceeding the load for which the sling or the like is designed. The sling or the like may comprise a chain, cable or rope used for lifting and moving loads.

It has heretofore been proposed to provide an overload indicator for slings; Patent No. 2,966,878 discloses an overload indicator in the form of a ring which is adapted to be deformed under overload to give a visual indication that the sling has been overloaded. The present invention is in the nature of an improvement over the indicator ring of that patent.

My deformable indicating element for slings and the like has special provision to insure against its deformation during proof testing and also is constructed so that its deformation even under overload is limited and after such limited deformation it is capable of continued use under overload. It has the further advantage over the indicator ring that it is not subject to being deformed back to its original shape to remove evidence of overload as is possible with a ring by simply turning the ring through an angle of 90° and reapplying the load.

I provide a deformable indicating element for slings and the like comprising a link having at least one projection extending inwardly generally toward the center of the link in the general plane of the link and terminating in a free end within the link substantially spaced from the opposite side of the link. Such projection limits the deformation of the link since after a predetermined amount of deformation it engages the opposite side of the link forming a rigid bar across the center of the link and substantially inhibiting further deformation of the link.

I preferably form the deformable indicating element as a somewhat elongated link having at least one projection extending inwardly from one of the longer sides of the link generally toward the center of the link in the general plane of the link and terminating in a free end within the link substantially spaced from the opposite side of the link. Such construction of the link insures its proper orientation when under load with the projection extending transversely of the direction of load.

The link may have opposed projections extending inwardly generally toward each other in the general plane of the link each terminating in a free end within the link, the free ends of the projections prior to deformation of the link being substantially spaced apart. This form of link insures substantially identical deformation of both sides of the link under load.

The link may be somewhat elongated and also have opposed projections extending inwardly from the opposed longer sides of the link generally toward each other in the general plane of the link each terminating in a free end within the link, the free ends of the projections prior to deformation of the link being substantially spaced apart.

Other details, objects and advantages of the invention will become apparent as the following description of certain present preferred embodiments thereof proceeds.

Figure 2:
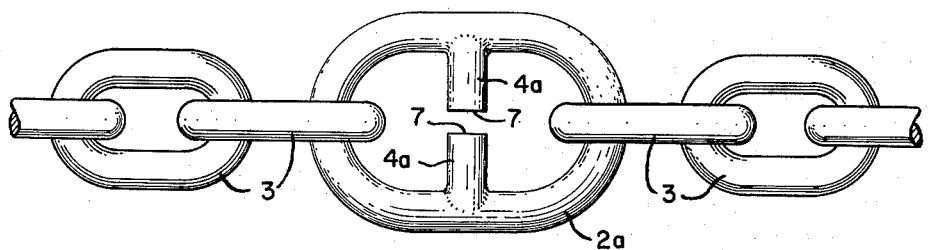
Figure 3:
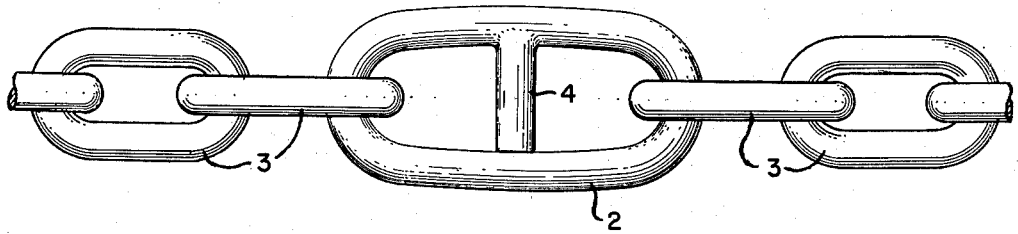

In the accompanying drawings I have shown certain present preferred embodiments of the invention in which FIGURE 1 is a diagrammatic view of a fragment of a chain sling including my deformable indicating element;

FIGURE 2 is a view similar to FIGURE 1 but showing a modified form of deformable indicating element; and FIGURE 3 is a view similar to FIGURE 1 showing the deformable indicating element of FIGURE 1 deformed under load in excess of the design load.

Referring now more particularly to the drawings, each of FIGURES 1, 2 and 3 shows a fragment of a chain sling in which is incorporated a deformable indicating element with adjacent portions of the chain sling. The sling except for the deformable indicating element may be a chain, cable, rope or other equivalent element adapted to extend about a load to be lifted and moved. In FIGURES 1 and 3 the deformable indicating element is designated generally by reference numeral 2 in FIGURE 2 the deformable indicating element is of somewhat modified form and is indicated by reference numeral 2a. In all three figures the sling apart from the deformable indicating element is designated generally by reference numeral 3.

Referring now to FIGURE 1, the deformable indicating element 2 is shown as being in the form of a link of somewhat elongated form made of any suitable material, normally ferrous metal such as steel. It may be forged out of stock of round or other cross section. A projection 4 extends inwardly from one of the longer sides of the link generally toward the center of the link in the general plane of the link and terminates in a free end within the link. As shown in FIGURE 1, the projection 4 extends not only generally toward the center of the link but somewhat therepast. The projection 4 is neither forged as an integral part of the link at 5 or welded to the link after the link is formed. When the link has not been deformed there is a substantial space 6 between the free end of the projection 4 and the opposite side of the link as clearly shown in FIGURE 1.

The somewhat elongated shape of the link insures that when the link is under load it will be properly oriented, i.e., with the load longitudinally of the link and hence transversely of the projection 4. When the link is subjected to load or stress exceeding the proof test load it deforms by being further elongated in the direction of its length until the free end of the projection 4 engages the opposite side of the link as shown in FIGURE 3.

The form of link shown in FIGURE 2 has opposed projections 4a extending inwardly from the opposite longer sides of the link 2a generally toward each other in the general plane of the link each terminating in a free end 7 within the link, the free ends of the projections prior to deformation of the link being spaced apart. When the link 2a is deformed by being subjected to a load in excess of the proof test lead it will be elongated in the same manner as the link 2 until the opposed projections 4a engage each other.

Thus, each form of link, 2 and 2a, serves when subjected to overload to provide a visual indication of the overload not only by reason of the fact that the link becomes elongated but more specifically by reason of the fact that the projection 4 of the link 2 engages the opposite side of the link and the projections 4a and the link 2a engage each other. This may be seen at a glance. Even before the projection 4 engages the opposite side of the link 2 or the projections 4a of the link 2a engage each other the deformation of the link results in a narrowing of the gap between the free end of the projection 4 and the opposite side of the link 2 or of the gap between the projections 4a of the link 2a which furnishes visual indication of overload. Indeed, if the amount of overload is a matter of interest it may be determined by measuring the width of the gap since the deformation characteristics of the link will be known.

One of the most important advantages of the invention is that the extent to which the link can deform under overload is limited when the projection 4 engages the opposite side of the link 2 or when the projections 4a engage each other. Thereafter the link has in effect a rigid transverse bar inhibiting substantial further lateral collapsing of the link so that the yield strength of the link is considerably increased in relation to the yield strength of a plain link not having the transverse reinforcing bar.

Another advantage of the invention is that a wedge may be inserted in the gap between the projection 4 and the opposite side of the link 2 or in the gap between the projections 4a of the link 2a during proof testing, inhibiting deformation of the link at that time.

While I have shown and described certain present preferred embodiments of the invention it is to be distinctly understood that the invention is not limited thereto but may be otherwise variously embodied within the scope of the following claims.

I claim:

1. A device for sustaining loads within a predetermined range comprising an elongated flexible body and an indicating element connected with the body and forming part of the device and subjected to the load to which the body is subjected, the indicating element differing from the body in that the indicating element is deformable to provide an easily recognizable indication when the device is subjected to a load greater than loads within said predetermined range, the indicating element comprising a link having at least one projection extending inwardly generally toward the center of the link in the general plane of the link and terminating in a free end within the link substantially spaced from the opposite sides of the link.

2. A device for sustaining loads within a predetermined range comprising an elongated flexible body and an indicating element connected with the body and forming part of the device and subjected to the load to which the body is subjected, the indicating element differing from the body in that the indicating element is deformable to provide an easily recognizable indication when the device is subjected to a load greater than loads within said predetermined range, the indicating element comprising a somewhat elongated link having at least one projection extending inwardly from one of the longer sides of the link generally toward the center of the link in the general plane of the link and terminating in a free end within the link substantially spaced from the opposite sides of the link.

3. A device for sustaining loads within a predetermined range comprising an elongated flexible body and an indicating element connected with the body and forming part of the device and subjected to the load to which the body is subjected, the indicating element differing from the body in that the indicating element is deformable to provide an easily recognizable indication when the device is subjected to a load greater than loads within said predetermined range, the indicating element comprising a link having opposed projections extending inwardly generally toward each other in the general plane of the link each terminating in a free end within the link, the free ends of the projections prior to deformation of the link being substantially spaced apart.

4. A device for sustaining loads within a predetermined range comprising an elongated flexible body and an indicating element connected with the body and forming part of the device and subjected to the load to which the body is subjected, the indicating element differing from the body in that the indicating element is deformable to provide an easily recognizable indication when the device is subjected to a load greater than loads within said predetermined range, the indicating element comprising a somewhat elongated link having opposed projections extending inwardly from the opposed longer sides of the link generally toward each other in the general plane of the link each terminating in a free end within the link, the free ends of the projections prior to deformation of the link being substantially spaced apart.

References Cited in the file of this patent

UNITED STATES PATENTS

| | | |
|---|---|---|
| 1,753,941 | Reid | Apr. 8, 1930 |
| 2,732,178 | Chaney | Jan. 24, 1956 |
| 2,753,680 | Lennenbank | July 10, 1956 |
| 2,966,878 | Freiser | Jan. 3, 1961 |

FOREIGN PATENTS

| | | |
|---|---|---|
| 629,455 | Germany | May 2, 1936 |
| 100,361 | Sweden | Nov. 26, 1940 |

UNITED STATES PATENT OFFICE
CERTIFICATE OF CORRECTION

Patent No. 3,077,178　　　　　　　　　　　　　　February 12, 1963

Ralph S. Gordon

It is hereby certified that error appears in the above numbered patent requiring correction and that the said Letters Patent should read as corrected below.

Column 2, line 18, after "2", first occurrence, insert -- and --; line 34, for "neither" read -- either --.

Signed and sealed this 24th day of September 1963.

(SEAL)
Attest:

ERNEST W. SWIDER　　　　　　　　　　　　　　DAVID L. LADD
Attesting Officer　　　　　　　　　　　　　　Commissioner of Patents